United States Patent Office 3,510,429
Patented May 5, 1970

3,510,429
VINYLIDENE FLUORIDE POLYMERS AS PROTECTIVE BARRIERS AGAINST INTENSE THERMAL RADIATION
Hyman Iserson, Trenton, N.J., and Francis Frederick Koblitz, Erdenheim, Pa., assignors to Pennwalt Corporation, a corporation of Pennsylvania
No Drawing. Filed June 17, 1966, Ser. No. 558,275
Int. Cl. C04b 43/12; E04b 1/74
U.S. Cl. 252—62                                          5 Claims

ABSTRACT OF THE DISCLOSURE

Personnel, materials, structures and equipment are protected from the injurious effects of short-time, concentrated exposure to intense thermal radiation by interposing between the substrate to be protected and the source of the intense thermal radiation a barrier comprised of a layer of vinylidene fluoride polymer containing dispersed therein from about 2 to about 70% by weight of a nonflammable, energy-reflective, light colored pigment.

---

This invention relates to the use of vinylidene fluoride polymers as protective barriers against intense thermal radiation. More particularly, this invention concerns a method of protecting a variety of substrates, including people, materials, structures and equipment, from the injurious effects of short-time but concentrated exposure to intense thermal radiation, which method comprises interposing between the source of the radiation and the substrate a barrier comprised of a normally solid vinylidene fluoride polymer containing dispersed therein an effective amount of a light colored, energy-reflective or energy-dissipating pigment.

Armed forces personnel engaged in tactical operations and space explorers in future ventures, as well as the equipment of such personnel, may be exposed to short periods of intense thermal radiation from atomic bomb explosions, solar energy or other high energy sources, that is, exposure to heat energies on the order of about 5 to about 30 calories/cm.$^2$/sec. for periods of from about one to about four seconds. (In comparison, normal solar radiation at the earth's surface is about 0.03 calorie/cm.$^2$/sec.) It is an object of this invention to provide a method for protecting personnel and equipment against such intense thermal radiation.

It has been discovered that interposing a protective layer of vinylidene fluoride polymer containing an effective amount of energy-reflective or energy-dissipating pigment between the substrate to be protected and the intense radiation source, such as in the form of film, sheet, fibrous mats, woven cloth and the like, affords considerable protection against the injurious effects of the radiation. It has been found that vinylidene fluoride polymers have unexpected superiority over other polymeric resins for this use with regard to ability to dissipate and attenuate intense thermal energy by smoke evolution, endothermic decomposition, reflection and emission, thus permitting a smaller proportion of the energy to reach the protected substrate.

The term "vinylidene fluoride polymer" used herein refers not only to the normally solid homopolymers of vinylidene fluoride, but also to the normally solid copolymers of vinylidene fluoride containing at least 50 mole percent of polymerized vinylidene fluoride units, preferably at least about 70 mole percent vinylidene fluoride and more preferably at least about 90%. Suitable comonomers are halogenated olefins containing up to 4 carbon atoms, for example, sym. dichlorodifluoroethylene, vinyl fluoride, vinyl chloride, vinylidene chloride, perfluoropropene perfluorobutadiene, chlorotrifluoroethylene, trichloroethylene, tetrafluoroethylene and the like. Methods of synthesizing vinylidene fluoride polymers are well known and many of the polymers are available commercially.

In accordance with this invention, the vinylidene fluoride polymer matrix has incorporated therein and dispersed throughout an effective amount of pigment, usually from about 2 to about 70 percent by weight and preferably from about 10 to about 55 percent by weight of the total composition. The pigment is present in the form of small, discrete particles having diameters within the range of about 0.01 micron to about 5 microns, and preferably within the range of about 0.1 to 1 micron. Suitable pigments are those which are non-flammable, lightly colored, energy-reflective, energy-refractive and heat dissipative, for example, titanium dioxide, chromic oxide, potassium titanate, antimony oxide, zirconium oxide, silica, hydrated magnesium carbonate, magnesium silicate, aluminum silicate, zirconium silicate, thorium oxide, zinc oxide, zinc sulfide, calcium carbonate, basic lead silicate, basic lead carbonate, dibasic lead phosphite, basic lead sulfate, lithophone, barium sulfates, and the like.

As mentioned previously, the vinylidene fluoride polymer compositions embodied herein will protect personnel, equipment and structures from the injurious effects of intense thermal radiation when interposed therebetween. When employed as an outer covering of film or sheet, or in the case of personnel as a protective outer garment, the film or sheet will have a thickness of from about 10 to 80 mils, preferably from about 20 to 40 mils. The method of casting film and sheet of vinylidene fluoride polymer compositions is well known. Briefly, the method involves dispersing the pigment in a solution of the vinylidene fluoride polymer, applying the mixture by knife or roller coating to a metal belt or other substrate, baking to evaporate solvents, cooling the polymer sheet and stripping it from the substrate.

In a preferred embodiment, the vinylidene fluoride polymer protective barrier is used in woven fabric form, and more preferred, in the form of nonwoven fibrous fabrics, both forms derived from fibers of the polymer. Fibers are usually formed by wet spinning techniques, that is, by extruding a solution of the polymer (in a solvent such as dimethylacetamide or dimethylformamide containing dispersed pigment) through a spinneret orifice into a coagulating bath. A particularly preferred method of producing fibers is disclosed in the copending application for patent of Francis F. Koblitz and Robert G. Petrella, Ser. No. 386,810, filed July 7, 1964, now U.S. Pat. No. 3,376,370. The polymer filaments in general, have a denier of about 5 to 20, and are spun in the form of yarn having a denier of about 100 to 1500. Cloth having a thickness of about 5 to 60 mils and a weight of about 4 to 20 oz./sq. yd. is made from these filaments and employed as a protective material. The following procedure can be followed to produce the nonwoven fibrous fabrics. Polymer fibers are chopped into segments having lengths within the range of about 0.01 to about 0.5 inch. The loose fibers are randomly deposited on a wire screen to the desired thickness, generally within the range of about 10 to about 250 mils, and the mat is heated and cooled through successive cycles until the mat is fused at the fiber junctures. Temperatures within the range of about 135 to about 225° C. are normally adequate to attain this fusion. The nonwoven fabrics generally have a weight of from about 5 to about 20 oz./sq. yd.

The following examples are presented to illustrate the invention embodied herein under conditions which approach the intense thermal radiation exposure which would be encountered under actual environmental testing.

Comparisons of the vinylidene fluoride polymers with other polymer compositions found to be unsuitable are also shown.

EXAMPLES

Preparation of polymer samples for testing

Molded discs.—The test discs were prepared by a standard method which comprises milling the finely divided resin and the pigment together on a rubber mill followed by grinding in a Wiley mill. The resin composition was then compression molded at 2500 p.s.i.g. at a temperature above the fusion point of the polymer into a circular plaque of the desired thickness, followed by immediate cold water quenching.

Non-woven fabrics.—Fibrous mats of polyvinylidene fluoride were prepared from fibers which were produced using the following standard technique. A slurry of polymer and pigment dispersed in dimethylacetamide was ground for 48 hours in a ball mill at room temperature. A measured amount of this slurry was added to a 20% solution of polymer in dimethylacetamide at 80° C. to give a solution containing the desired amount of resin and dispersed pigment, e.g., 15 to 20% pigment by volume. The solution was extruded through the orifices of a spinneret into a coagulating bath consisting of one part methanol and six parts of water at 65° C. The resulting fiber was dried by passing it through a hot box maintained at 200 to 220° C. at 50 ft. per minute.

The fibers were chopped, then separated by shaking in a stream of air, and deposited randomly on a wire screen. The screen bearing the loose fibers was heated in an oven for five minutes at 140° C., cooled to room temperature, heated again for five minutes at 140° C., cooled again, and finally heated three minutes at 155° C. This cycle of heating and cooling gave the desired degree of fusion at the fiber junctures without excess shrinkage of the fibers.

Intense thermal radiation tests using QM carbon arc apparatus

It is known that the sun, a nuclear explosion, and a carbon arc produce similar energy spectra, i.e., the energy distribution and the wave lengths produced are all in the same range (less than 7 microns). However, although a carbon arc attains a surface temperature in the same range as a nuclear explosion, it delivers only a small fraction of the energy delivered by an explosion. Therefore, the polymer samples described herein were tested for their resistance to intense thermal radiation by focusing the energy supplied by a "Quartermaster Carbon Arc Apparatus" into a narrow concentrated beam of one inch diameter at the target zone to approximate the rate of delivery of energy supplied by a nuclear explosion. By this focusing process, thermal fluxes on the samples many times greater than solar thermal fluxes and approaching that of nuclear explosions are attained using the carbon arc source. These thermal fluxes in cal./cm.$^2$/sec. are on the order of:

Solar at earth's surface—ca. 0.033,
Quartermaster Carbon Arc—ca. 18 to 24,
Nuclear explosion—ca. 25 to 30 (up to the distance of essentially complete destruction from the blast).

The polymer test samples were exposed to the focussed beam of the Quartermaster Carbon Arc apparatus for one second. The rise in temperature from ambient of the unexposed side of the sample was measured during the exposure period and reported as the ΔT noted for a particular test specimen. The higher the ΔT value for a sample, the poorer is its relative ability to act as a barrier to protect against intense thermal radiation.

Examples 1–20

The results of tests performed on molded discs of various polymer compositions are summarized in Table I and in the discussion that follows the table. The data taken and observations made illustrate the unexpected superiority of homopolymers and copolymers of vinylidene fluoride as protective barriers against intense thermal radiation.

TABLE I.—INTENSE THERMAL RADIATION TESTS ON MOLDED DISCS

| Ex. No. | Resin | Pigments Type | Conc. | Thickness of disc, mils | ΔT, °C. |
|---|---|---|---|---|---|
| 1 | VF$_2$(71%)/CTFE (29%) copolymer | CrO$_3$ | 5 wt. percent | 60 | 8.7 |
| 2 | do | TiO$_2$ | do | 60 | 7.2 |
| 3 | VF$_2$(70%)/CTFE(30%)copolymer | Cr$_2$O$_3$ | do | 60 | 8.7 |
| 4 | do | Potassium titanate | do | 60 | 9.4 |
| 5 | Poly VF$_2$ ("Kynar") | {TiO / Cr$_2$O$_3$} | {7 wt. percent / 1 wt. percent} | 30 | 9.4 |
| 6 | do | Cr$_2$O$_3$ | 5 wt. percent | 50 | 10.8 |
| 7 | do | {Cr$_2$O$_3$ / TiO$_2$} | {1 vol percent / do} | 30 | 9.7 |
| 8 | do | {Cr$_2$O$_3$ / TiO$_2$} | {1 vol. percent / 7 vol. percent} | 30 | 9.4 |
| 9 | do | {Cr$_2$O$_3$ / TiO$_2$} | {1 vol. percent / 15 vol. percent} | 30 | 9.2 |
| 10 | do | {Cr$_2$O$_3$ / Sb$_2$O$_3$} | {1 vol. percent / 7 vol. percent} | 30 | 10.3 |
| 11 | do | {Cr$_2$O$_3$ / Sb$_2$O$_3$} | {1 vol percent / 15 vol. percent} | 30 | 10.5 |
| 12 | Poly TFE (Teflon") | Cr$_2$O$_3$ | 5 wt. percent | 30 | 37.6 |
| 13 | do | do | do | 50 | 37.7 |
| 14 | do | do | do | 60 | 36.3 |
| 15 | Poly TRFE | do | do | 30 | 17.4 |
| 16 | do | do | do | 50 | 17.7 |
| 17 | Poly VF ("Tedlar") | do | do | 30 | 20.4 |
| 18 | do | do | do | 60 | 16.8 |
| 19 | PE (high density "Hi-Fax") | do | do | 50 | 24.9 |
| 20 | do | do | do | 60 | 19.2 |

VF$_2$=vinylidene fluoride, CTFE=chlorotrifluoroethylene, TFE=tetrafluoroethylene, TFRE=trifluoroethylene, VF=vinyl fluoride, PE=polyethylene.

Other observations made in the foregoing and in similar tests on molded discs of other polymers were as follows:

Polyvinylidene fluoride (homopolymer) samples charred during exposure and evolved a dense white smoke; about half of the samples of the homopolymer tested ignited during exposure but did not support combustion after the intense, exterior energy source was cut off. The vinylidene fluoride copolymer samples did not ignite, i.e., they were completely nonflammable. All samples of polyethylene ignited during exposure and continued to burn after the heat source was removed. Discs of a vinylidene chloride-vinyl chloride copolymer containing a predominant proportion of vinylidene chloride ("Saran 281") ignited upon exposure and it was impossible to measure the ΔT. Samples of vinyl chloride polymers ("Geon 101") showed heavy flaming, however, it was possible to measure the ΔT as 22.3° C. Samples of a resinous chlorinated polyether ["Penton," poly $(C_4H_6OCl_2)$] had a low $\Delta T$ of 12.5° C., but ignited and continued to burn after cessation of exposure.

Examples 21–24

The results of these tests, summarized in Table II show the enhanced protective capability of vinylidene fluoride polymers when employed as thermal radiation barriers in the form of fibrous mats rather than as sheets or film. Example 21 illustrates the necessity for incorporating a pigment in the polymer composition.

TABLE II.—INTENSE RADIATION TESTS ON FIBROUS MATS OF VINYLIDENE FLUORIDE POLYMER [1]

| Ex. No. | Fiber length, inches | Fiber diameter, mils | Mat thickness, mils | Pigments Type | Concentration wt. percent | $\Delta T$., ° C. | |
|---|---|---|---|---|---|---|---|
| 21 | 1 | 1 | 220 | | None | 37<br>37<br>24<br>19<br>17<br>5 | Successive tests.[4] |
| 22 | 1 | 1 | 220 | $Cr_2O_3$ | 10 | 1.2<br>1.4<br>1.1<br>1.4 | Successive Tests.[4] |
| 23 | ¼–½ | 1 | 61 | $Cr_2O_3$<br>$TiO_2$<br>"Magcarb W"[3] | 10<br>8<br>2 | 9.5 | |
| 24 | ¼–½ | 1 | 56 | do | 2 | 6.2 | |

[1] Resin used was homopolymer of $VF_2$ ("Kynar").
[2] Mat density ranged from about 12 to about 15 oz./sq. yd.
[3] $(MgCO_3)_4 \cdot Mg(OH)_2 \cdot 12H_2O$
[4] "Successive tests" means consecutive exposures of one second each on the same sample with cooling to ambient temperature between tests.

Additional tests confirmed that a suitable pigment as described previously is a necessary component of the vinylidene fluoride polymer composition. Films having no pigment were apparently transparent to the energy of the focussed carbon arc and burned through upon exposure. Films containing darker colored pigments, for example, carbon black, cadmium reds and iron oxide pigments, also burned through when exposed to the intense thermal radiation.

It is understood that the foregoing examples are set forth to illustrate the invention and are not meant to be limitative of its scope as defined by the appended claims.

We claim:
1. A method of protecting a substrate from the injurious effects of intense thermal radiation which comprises interposing between such substrate and the source of the intense thermal radiation a barrier comprised of a layer of vinylidene fluoride polymer selected from the group consisting of a normally solid homopolymer of vinylidene fluoride and a normally solid copolymer of vinylidene fluoride with a halogenated olefin containing up to 4 carbon atoms, said copolymer containing at least 50 mole percent of vinylidene fluoride, containing dispersed therein from about 2 to about 70% by weight of a nonflammable light colored pigment selected from the group consisting of titanium dioxide, chromic oxide, potassium titanate, antimony oxide, zirconium oxide, silica, hydrated magnesium carbonate, magnesium silicate, aluminum silicate, zirconium silicate, thorium oxide, zinc oxide, zinc sulfide, calcium carbonate, basic lead silicate, basic lead carbonate, dibasic lead phosphite, basic lead sulfate, lithophone and barium sulfates, said amount of pigment based on the total weight of the vinylidene fluoride polymer and pigment.

2. The method of claim 1 wherein the barrier is in the form of a sheet having a thickness of from about 10 to about 80 mils.

3. The method of claim 1 wherein the barrier is in the form of a woven cloth having a thickness of about 5 to 60 mils and a weight of about 4 to 20 oz./sq. yd.

4. The method of claim 1 wherein the barrier is in the form of a nonwoven fabric having a thickness of from about 10 to about 250 mils composed of filaments having lengths within the range of about 0.01 to about 0.5 inch and a denier within the range of about 5 to 20.

5. The method of claim 4 wherein the barrier contains from about 10 to about 55 percent of pigment.

References Cited

UNITED STATES PATENTS

| | | | |
|---|---|---|---|
| 2,956,048 | 10/1960 | Bolstad et al. | 260—87.7 |
| 2,965,619 | 12/1960 | Honn et al. | 260—87.7 X |
| 3,136,745 | 6/1964 | Albin et al. | 260—87.7 |
| 3,193,539 | 7/1965 | Hauptschein | 260—87.7 |
| 3,311,585 | 3/1967 | Edlin | 117—137 X |

LEON D. ROSDOL, Primary Examiner

I. GLUCK, Assistant Examiner

U.S. Cl. X.R.

106—15, 16; 117—137; 161—403; 250—108